United States Patent [19]
Bueser et al.

[11] Patent Number: 5,407,329
[45] Date of Patent: Apr. 18, 1995

[54] PRESSURE REGULATOR FOR FUEL INJECTION DEVICES

[75] Inventors: Wolfgang Bueser, Tamm; Lorenz Drutu, Kornwestheim, both of Germany

[73] Assignee: Robert Bosch GmbH, Stuttgart, Germany

[21] Appl. No.: 251,995

[22] Filed: Jun. 1, 1994

[30] Foreign Application Priority Data

Jun. 24, 1993 [DE] Germany .................. 43 20 925.4

[51] Int. Cl.⁶ .............................................. F16K 17/06
[52] U.S. Cl. ................................... 417/311; 137/508; 417/310
[58] Field of Search ................. 137/508; 417/310, 311

[56] References Cited

U.S. PATENT DOCUMENTS 4,171,925 10/1979 Krambrock ................... 137/508 X
4,551,128 11/1985 Hakim ......................... 137/508 X

FOREIGN PATENT DOCUMENTS 3900264 7/1990 Germany .

*Primary Examiner*—Robert G. Nilson
*Attorney, Agent, or Firm*—Edwin E. Greigg; Ronald E. Greigg

[57] ABSTRACT

The pressure regulator is suitable for disposition in a fuel pump. The pressure regulator has a metal bellows, which is connected on one end to a retaining ring and on the other end to a disk. An element is screwed into the retaining ring, which element carries a valve closing member of a seat valve, whose valve seat encompasses an outlet bore of the disk. The interior of the bellows communicates with the compression side of the fuel pump by means of an opening of the element, and with the intake side by means of the outlet bore of the disk.

8 Claims, 1 Drawing Sheet

PRESSURE REGULATOR FOR FUEL INJECTION DEVICES

BACKGROUND OF THE INVENTION

Fuel injection devices use a pressure regulator, which is disposed downstream of a fuel pump in terms of the direction of supply. The pressure regulator regulates the pressure (system pressure) in the fuel system. It requires installation space in the engine compartment. Exacting requirements will be placed on the installation in terms of leakproofness.

The fuel pump, which serves to supply fuel and to effect the pressure buildup in the fuel system, for example according to German patent application DE-A-3900264, is equipped with a seat valve which opens when subjected to overpressure, and which is disposed in a bypass that leads from the compression side to the intake side. In addition, a check valve is provided on the outgoing side of the pump's drive motor, through which fuel flows, in order to avoid a return flow of the fuel when the supply is static. In other words, several measures are taken in the fuel system for monitoring the pressure.

OBJECT AND SUMMARY OF THE INVENTION

The pressure regulator according to the invention has the advantage that it can be used for both pressure regulation in the fuel system and pressure limiting of the fuel pump and that it can be built into the pump, since it requires minimal installation space. In addition, the pressure regulator is distinguished by high-quality regulation, since virtually the entire end face of the disk carrying the valve seat, which is the face oriented toward the inside of the bellows, is acted upon by the fuel pressure. By means of the regulator's disposition within the pump, no harm is done if the seat valve does not fully seal when it closes.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
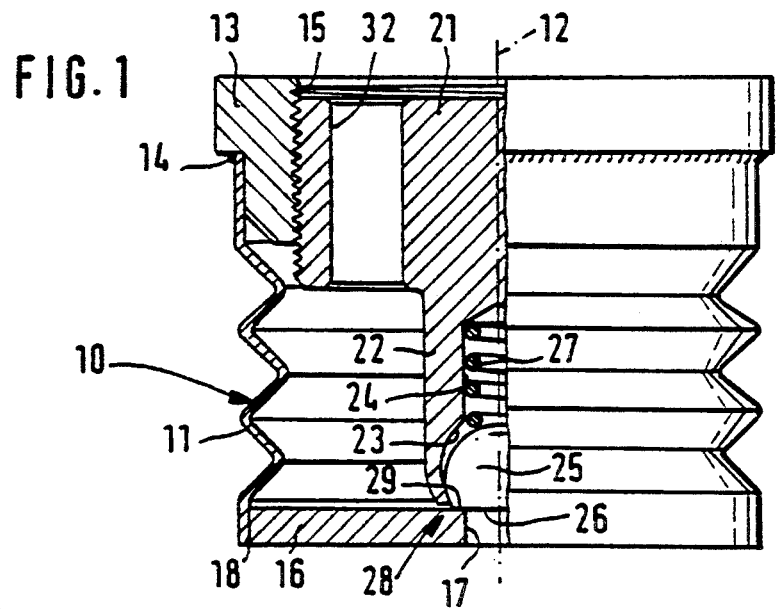
FIG. 1, partly in section, shows a side view of a pressure regulator, drawn to an exaggerated scale.

The pressure regulator 10 from FIG. 1, described below, has a tubular metal bellows 11, which is bounded on either end at right angles to its longitudinal axis 12. On its one end, the bellows 11 is connected with a retaining ring 13 by an encompassing weld seam 14. Concentric to the longitudinal axis 12, the retaining ring 13 has a through bore 15 of relatively large diameter with an internal screw thread. On its other end, the bellows 11 is closed by a disk 16, having a central outlet bore 17, by means of an encompassing weld seam 18.

A substantially symmetrical element 21 is screwed into the through bore 15 of the retaining ring 13, which element 21 has a circular, cylindrical projection 22 oriented toward the outlet bore 17 of the disk 16. The projection 22 has an open recess on its end in the form of a ball socket 23, from which a blind bore 24 leads. A valve closing member in the form of a flattened ball 25 is received with play in the ball socket 23. On its side remote from the flat surface 26, the ball 25 is spring-loaded by a compression spring 27 disposed in the blind bore 24. The ball 25 is form fittingly retained, to keep it from coming out of the ball socket 23, by means of a crimped-over edge of the free end of the projection 22. The ball 25 is part of a seat valve 28, whose valve seat 29 is a flat annular surface encompassing the outlet bore 17 of the disk 16.

The element 21 also has an opening which leads to the interior of the bellows 11, which opening is in the form of two bores 32, which extend parallel to the longitudinal axis 12 and are spaced equidistantly apart, and which discharge freely into the interior of the bellows 11 next to the projection 22. In a variant of the exemplary embodiment, the number of bores 32 can be different.

Figure 2:
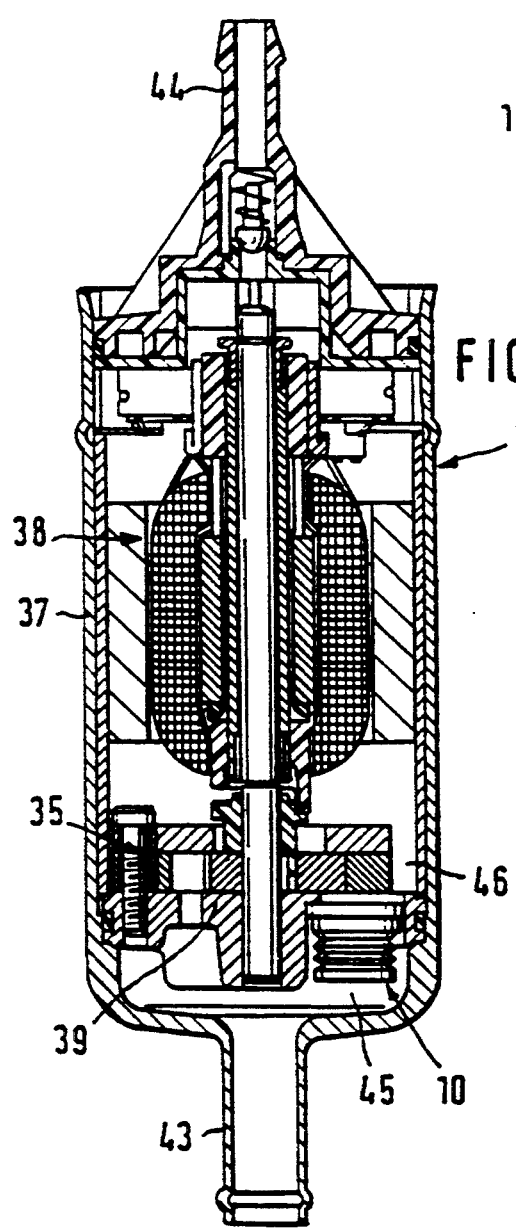
FIG. 2, on a different scale, shows a longitudinal section through a unit made up of the fuel pump and its drive motor, having a built-in pressure regulator.
Figure 3:
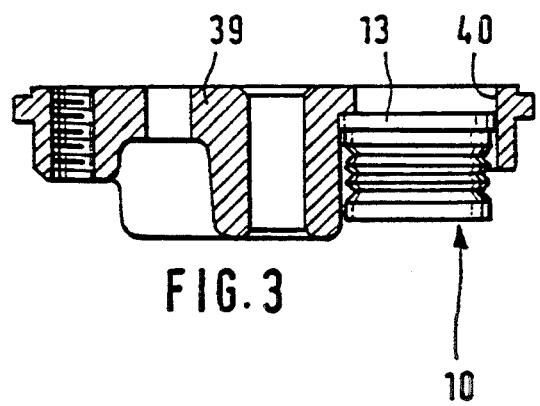
FIG. 3 shows a section, on an exaggerated scale, of a pump cap, having a pressed-in pressure regulator according to FIG. 2.

The pressure regulator 10 is provided for disposition in a fuel pump 35 for fuel injection systems of Otto engines (not shown). As shown in FIG. 2, the fuel pump 35, which can, for example, be an interior gear pump, is a component of a unit 36 which also contains within a common housing 37 an electric drive motor 38 of the pump 35. The fuel pump 35 has an intake side pump cap 39, which is shown in an enlargement in FIG. 3, having a recess 40 that goes all the way through, which receives the pressure regulator 10 with a close fit. Securing of the pressure regulator 10 is achieved by means of a frictional connection between the pump cap 39 and the retaining ring 13, whose diameter is embodied as larger than that of the bellows 11 and the disk 16.

The disposition of the pressure regulator 10 in the pump 35 which supplies fuel from an intake side connection piece 43 to a compression side connection piece 44 shows that the outlet bore 17 of the disk 16 and the bores 32 in the element 21 communicate respectively with the intake side 45 and the compression side 46. Upon supply of fuel, the pressure regulator 10 functions as follows:

The fuel, supplied in excess by the fuel pump 35, fills the interior of the bellows 11 and exerts a pressure on the disk 16. The disk 16, having an adjusted closing force loading the ball 25 of the seat valve 28, is lifted by valve seat 25 from the flat surface 26, counter to a prestressing force of the bellows 11, when the predetermined system pressure of the fuel injection system is exceeded, so that excess fuel can flow from the compression side 46 of the pump 35, by means of the outlet bore 17 of the disk 16 to the intake side 45.

The aforementioned system pressure of the fuel injection system is easily adjusted when the pressure regulator 10 is installed: By means of the corresponding screwing of the element 21 into the retaining ring 13, the ball 25 is brought into contact with the disk 16; the compression spring 27 makes possible a flush, large-area contact of the flat surface 26 of the ball 25 with the flat valve seat 29 of the disk 16. Screwing the element 21 in to a corresponding depth prestresses the bellows 11 until the set point of the pressure regulator 10 is reached by appropriate measurement. Accurate setting is possible by means of using a fine thread on the retaining ring 13 and the element 21. The set point of the pressure regulator 10 is fixed in place by an appropriate means to prevent relative rotation between the element 21 and the retaining ring 13.

The bores 32 can be used for engagement by a turning or screwdriving tool for screwing the element 21 in. This tool, not show, engages the bores 32 with a suitable number of pins.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A pressure regulator (10) for fuel injection devices of Otto engines for disposition in a fuel pump (35), having a seat valve (28) monitoring an opening from a compression side (46) to an intake side (45) of the pump;
    a tubular metal bellows (11) that is defined on both ends at right angles to its longitudinal axis (12);
    on its one end, the bellows (11) is sealingly connected to a retaining ring (13), which has a through bore (15) which is concentric to the longitudinal axis (12) and has an internal screw thread;
    on its other end, the bellows (11) is closed by means of a disk (16) having an outlet bore (17);
    an element (21), which has at least one opening (32) that leads into the interior of the bellows (11) for fuel supplied by the pump (35), is screwed into the through bore (15) of the retaining ring (13);
    the element (21) is provided with a circular-cylindrical projection (22), oriented toward the outlet bore (17) of the disk (16); and
    a valve closing member which cooperates with a valve seat (29) that encompasses the outlet bore (17) of the disk (16), which outlet bore (17) is in constant communication with the pump intake side (45) is received on the projection (22).

2. A pressure regulator as defined by claim 1, in which the valve closing member is a flattened ball (25) and the valve seat (29) is a flat annular surface.

3. A pressure regulator as defined by claim 2, in which the ball (25) is received form-fittingly with play in a ball socket (23) of the element projection (22) and is spring-loaded on its side remote from the valve seat (29) by a compression spring (27).

4. A pressure regulator as defined by claim 1, in which the bellows (11) is welded to the retaining ring (13) and the disk (16).

5. A pressure regulator as defined by claim 1, in which the retaining ring (13) and the element (21) are in engagement with one another by means of fine screw thread.

6. A pressure regulator as defined by claim 1, in which the element (21) is secured against relative rotation in the retaining ring.

7. A pressure regulator as defined by claim 1, in which the opening of the element (21) is embodied by at least two bores (32), which extend parallel to the longitudinal axis (12) and are spaced equidistantly apart and discharge into the interior of the bellows (11) next to the projection (22).

8. A pressure regulator as defined by claim 1, in which the retaining ring (13) is embodied as having a larger diameter than the bellows (11) and the disk (16) and is received in a close-fitting recess (40) of the intake side cap (39) of the fuel pump (35), for example by means of a frictional connection.

* * * * *